(12) United States Patent
Asselin et al.

(10) Patent No.: US 9,987,509 B1
(45) Date of Patent: Jun. 5, 2018

(54) PRESSURE CONTROLLER FOR FIRE PROTECTION SYSTEM MAINTAINED UNDER VACUUM, AND RELATED METHOD

(71) Applicant: SYSTÈMES FIREFLEX INC., Boisbriand (CA)

(72) Inventors: Jean-Pierre Asselin, Blainville (CA); Sylvain Coupal, St-Jérôme (CA); Frédéric Lachance, Lachenaie (CA); Jonathan Roger, Terrebonne (CA)

(73) Assignee: Systèmes Fireflex Inc. (CA)

( * ) Notice: Subject to any disclaimer, the term of this patent is extended or adjusted under 35 U.S.C. 154(b) by 0 days. days.

(21) Appl. No.: 15/656,309

(22) Filed: Jul. 21, 2017

Related U.S. Application Data

(60) Provisional application No. 62/468,996, filed on Mar. 9, 2017.

(51) Int. Cl.
| | |
|---|---|
| *A62C 35/62* | (2006.01) |
| *G05D 16/20* | (2006.01) |
| *G08B 21/18* | (2006.01) |
| *A62C 35/68* | (2006.01) |
| *A62C 37/40* | (2006.01) |

(52) U.S. Cl.
CPC ............. *A62C 35/62* (2013.01); *A62C 35/68* (2013.01); *G05D 16/2066* (2013.01); *G08B 21/182* (2013.01); *A62C 37/40* (2013.01)

(58) Field of Classification Search
CPC ......... A62C 35/62; A62C 35/68; A62C 35/66; A62C 37/40; A62C 35/02; A62C 35/026; A62C 37/44; B05B 11/02; B05B 1/34
See application file for complete search history.

(56) References Cited

U.S. PATENT DOCUMENTS

| | | | |
|---|---|---|---|
| 3,759,331 | A | 9/1973 | Livingston |
| 5,927,406 | A | 7/1999 | Kadoche |
| 5,971,080 | A | 10/1999 | Loh et al. |
| 6,209,654 | B1 | 4/2001 | Curless |
| 6,357,531 | B1 | 3/2002 | Asselin |
| 6,715,561 | B2 | 4/2004 | Franson |
| 7,134,507 | B2 | 11/2006 | Heskestad |
| 8,307,906 | B2 | 11/2012 | Reilly et al. |
| 8,657,022 | B2 | 2/2014 | Smith et al. |
| 8,763,711 | B2 | 7/2014 | Stephens |
| 9,095,736 | B2 | 8/2015 | Kochelek et al. |
| 2002/0121381 | A1* | 9/2002 | Reilly ............. A62C 35/62 169/14 |
| 2005/0252663 | A1 | 11/2005 | Olson et al. |
| 2005/0252664 | A1 | 11/2005 | Clum et al. |
| 2007/0144748 | A1 | 6/2007 | Clum et al. |
| 2009/0236104 | A1 | 9/2009 | Banis et al. |
| 2011/0000685 | A1 | 1/2011 | Matsuoka |

(Continued)

FOREIGN PATENT DOCUMENTS

| | | |
|---|---|---|
| CA | 2560020 A1 | 6/2000 |
| CA | 2256111 C | 5/2009 |
| WO | 2014182810 A1 | 11/2014 |

*Primary Examiner* — Mirza Alam
(74) *Attorney, Agent, or Firm* — Price Heneveld LLP

(57) ABSTRACT

The invention is directed to a pressure controller and a method for monitoring and controlling the pressure level in a fire protection piping network maintained under vacuum pressure and for detecting a positive pressure variation in the network. The rate of pressure increase is used to detect the opening of a sprinkler head in the sprinkler piping network.

26 Claims, 9 Drawing Sheets

(56) References Cited

U.S. PATENT DOCUMENTS

| | | | |
|---|---|---|---|
| 2011/0186310 A1* | 8/2011 | Issartel | A62C 35/62 |
| | | | 169/5 |
| 2011/0259615 A1* | 10/2011 | von Blucher | A62C 99/00 |
| | | | 169/46 |
| 2012/0031630 A1* | 2/2012 | Stephens | A62C 3/004 |
| | | | 169/17 |
| 2015/0321035 A1 | 11/2015 | Nikkarila | |
| 2016/0001112 A1 | 1/2016 | Kadoche | |
| 2016/0008643 A1 | 1/2016 | Kadoche | |
| 2016/0141824 A1* | 5/2016 | Matsuda | H01S 3/036 |
| | | | 372/58 |

* cited by examiner

PRESSURE CONTROLLER FOR FIRE PROTECTION SYSTEM MAINTAINED UNDER VACUUM, AND RELATED METHOD

CROSS-REFERENCE TO RELATED APPLICATION

This application claims priority to and the benefit under 35 U.S.C. § 119(e) of U.S. Provisional Patent Application No. 62/468,996, filed on Mar. 9, 2017, the entire disclosure of which is incorporated herein by reference.

TECHNICAL FIELD OF THE INVENTION

The technical field relates to fire protection piping networks maintained below atmospheric pressure, commonly referred as vacuum piping networks or vacuum systems. More precisely, the invention is directed to a pressure controller and to a method for monitoring and controlling the pressure level in a piping network and for detecting a positive pressure variation in a fire protection piping network maintained under vacuum.

BACKGROUND

Most fire protection systems operate at positive pressure or at atmospheric pressure. So called "dry systems" or "dry pipe systems" operate through a network of fluid lines or pipes, filled with a gas (typically air—but other gases can be used). A monitoring system detects any pressure drops in the system to identify either a gas leak in the pipes or the opening of one or more sprinklers. When a sprinkler opens, the pressure in the pipes decreases and the pressure sensors detect the resulting pressure drop. Depending on the pressure drop rate detected, a compressor can be activated to re-pressurize the pipes (in case of a leak), or a water valve can be opened to let water flow through the pipe network (in case of a fire/sprinkler opening).

Since dry systems pipes are filled with fluid, when a sprinkler is activated, the gas fluid flow must escape or be expelled from the open sprinkler head before the water can reach the sprinkler head and be delivered to the specific hazard. The volume of gas fluid which must be vented, limits the use of grid piping network configurations. Furthermore, most of these systems use air, which contains moisture, as fluid gas, and as such may cause corrosion in the piping network.

An example of such system is described in U.S. Pat. No. 5,971,080, filed by Central Sprinkler Corporation, and now owned by Tyco Fire Products LP. This system monitors and detects a rate of loss of pressure (negative rate of change) in gas charged fluid flow lines. This system is designed for dry pipe systems charged with fluid at a pressure maintained above atmospheric pressure.

Also known in the art, is a virtual accelerator, such as described in U.S. Pat. No. 6,357,531, that detects a sprinkler head activation but only in charged fluid flow lines at a pressure maintained above atmospheric pressure.

In view of the above, there is a need for a device and a method for detection of a sprinkler opening for piping networks maintained under vacuum pressure which would be able to overcome or at least minimize some of the above-discussed prior art concerns.

SUMMARY OF THE INVENTION

According to the invention, there is provided a pressure controller for use in a fire protection system comprising a piping network maintained under vacuum pressure by a vacuum pump for monitoring and detecting a positive rate of change of the vacuum pressure level in the piping network, and for controlling the pressure level in the piping network. By vacuum, it is meant that the piping network is maintained under negative pressure, or under the atmospheric pressure.

According to an aspect of the invention, there is provided a pressure controller for use in a fire protection system comprising a piping network maintained under vacuum pressure by a vacuum pump, to monitor the pressure level in the piping network. The pressure controller comprises a pressure transducer for sampling a pressure in the piping network and generating a pressure signal. The pressure controller further comprises a processor module. The processor module includes an input for receiving the pressure signal from the pressure transducer; a pressure rate calculator for calculating the rate of change of the pressure signal; a rate comparator for comparing the rate of change to a predetermined positive rate of change value; and an output for sending a positive rate signal when the rate of change is higher than the predetermined positive rate of change value, the positive rate signal being indicative that a sprinkler head of the piping network is open.

According to another aspect of the invention, there is provided a method for monitoring a pressure level in a piping network in a fire protection system, the piping network being maintained under vacuum pressure by a vacuum pump. The method comprises the steps of sampling the pressure in the piping network with a pressure transducer that generates a pressure signal, calculating the rate of change of the pressure signal generated, comparing the rate of change to a predetermined positive rate of change value, and sending a positive rate signal when the rate of change is higher than the predetermined positive rate of change value, the positive rate signal being indicative that a sprinkler head of the piping network is open.

BRIEF DESCRIPTION OF THE DRAWINGS

It will be noted that throughout the appended drawings, like features are identified by like reference numerals.

DETAILED DESCRIPTION

Figure 1:
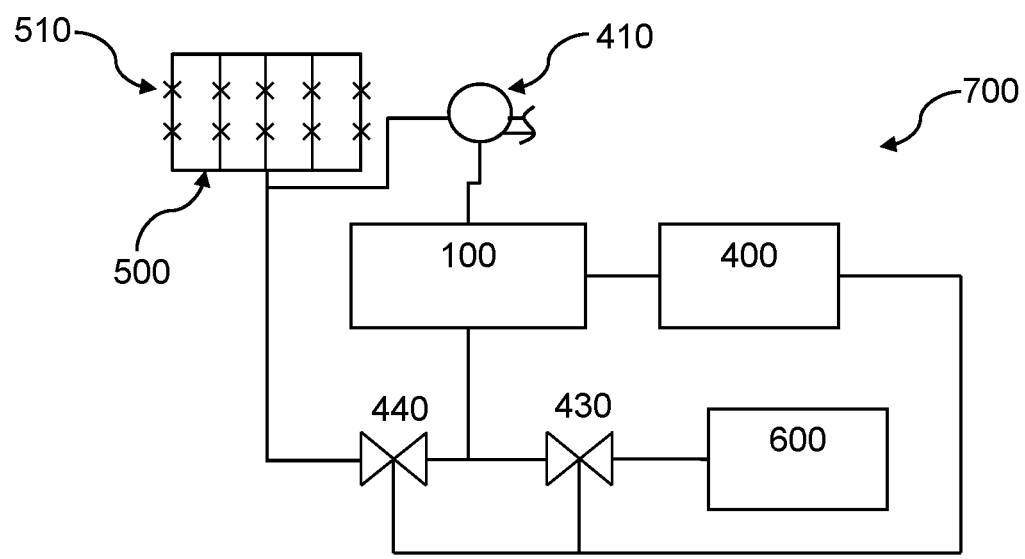
FIG. 1 is a schematic illustration of a fire protection system comprising a piping network maintained under vacuum pressure according to a possible configuration.

An objective of the present invention is to improve the capabilities and performances of sprinkler systems maintained under vacuum pressure. Such systems are typically termed as vacuum sprinkler systems. Vacuum sprinkler systems offer corrosion mitigation measures and allow using grid piping network configurations which improve hydraulic performances compared to standard tree configurations. Vacuum sprinkler systems also allow combining closed and opened sprinkler heads on the same piping network, with the use of check valves. The pressure controller, according to the present invention, can monitor and control the vacuum pressure level in a vacuum sprinkler network system. The pressure controller can also detect the opening of a sprinkler head by detecting increases in pressure rates of the vacuum sprinkler network which are above a predetermined pressure rate value.

In contrast with fluid charged sprinkler systems, in which a compressor is used to pressurize a fluid within the piping network, vacuum sprinkler systems use a vacuum pump to lower the pressure within the piping network below atmospheric pressure, thereby creating a vacuum within the network. In operation, the pressure controller monitors the pressure in the vacuum piping network, and controls either a vacuum pump or a water supply valve, when a pressure increase or pressure rate increase is detected (typically resulting from either a gas intake in the system, due to a "leak" or to a sprinkler opening). The pressure controller detects pressure increases or pressure rate increases, and activates either one of a vacuum pump or a water supply valve, depending on the pressure increase detected. The pressure controller can detect a vacuum pressure increase of about 0.01 psi per second, and therefore quickly detect a sprinkler head opening.

In the following description, although the embodiments of the pressure controller and corresponding parts thereof consist of certain configurations as explained and illustrated herein, not all the described components are essential and thus should not be taken in a restrictive sense. It is to be understood, as also apparent to a person skilled in the art, that other suitable components and cooperation therebetween, as well as other suitable configurations, may be used for the pressure controller, as will be briefly explained hereinbelow and as can be easily inferred herefrom by a person skilled in the art.

Moreover, the same numerical references refer to similar elements. For the sake of simplicity and clarity, namely so as to not unduly burden the figures with several references numbers, not all figures contain references to all the components and features. References to some components and features may be found in only one figure, and components and features of the present disclosure which are illustrated in other figures can be easily inferred therefrom. The embodiments and configurations shown in the figures are optional, and are given for exemplification purposes only.

With reference to FIG. 1, a possible configuration of a fire protection system (700) comprising a piping network (500) maintained under vacuum pressure is shown. The fire protection system (700) comprises sprinkler heads (510) mounted on the piping network (500) maintained under vacuum using a vacuum pump (410). Sprinkler heads used on this type of piping networks are typically certified for use under vacuum pressure. The level of pressure, or vacuum level, is monitored and controlled by a pressure controller (100). The pressure controller (100) is connected to a control panel (400) (sometimes referred to as a "release control panel") and to the vacuum pump (410). When the pressure controller (100) detects a pressure or pressure rate that is outside predetermined target intervals, the pressure controller sends alarm signals to the control panel (400), and/or sends control signals directly to the vacuum pump (410). An increase in the pressure rate of the piping network above a predetermined threshold indicates a sprinkler head opening.

In this case, an alarm signal is sent from the pressure controller (100) to the control panel (400), which in turn controls the deluge valve (440) allowing fluid from a fluid source (600) to enter in the piping network (500). The service valve (430) (also referred to as the "main valve") is maintained open while the fire protection system is in operation. The pressure controller (100) can also stop the vacuum pump (410) upon detecting a sprinkler head opening. A double spring loaded check valve (or other similar security valve) on the vacuum pump (410) ensures that fluid is prevented from entering the vacuum pump when it is injected in the piping network. Both the deluge valve (440) and the service valve (430) are connected to the pressure controller (100) and to the control panel (400). The service valve (430) can be used to control a fluid flow in the piping network during maintenance operations. The pressure controller can also detect pressure rate increases which are not necessarily related to a sprinkler head opening, but that may be caused by a gas intake due, for example, to the presence of leaks in the piping network or to a malfunction of the vacuum pump. Although not shown, the piping network (500) can also include check valves when closed and opened sprinkler heads are combined in the same piping network.

Figure 2:
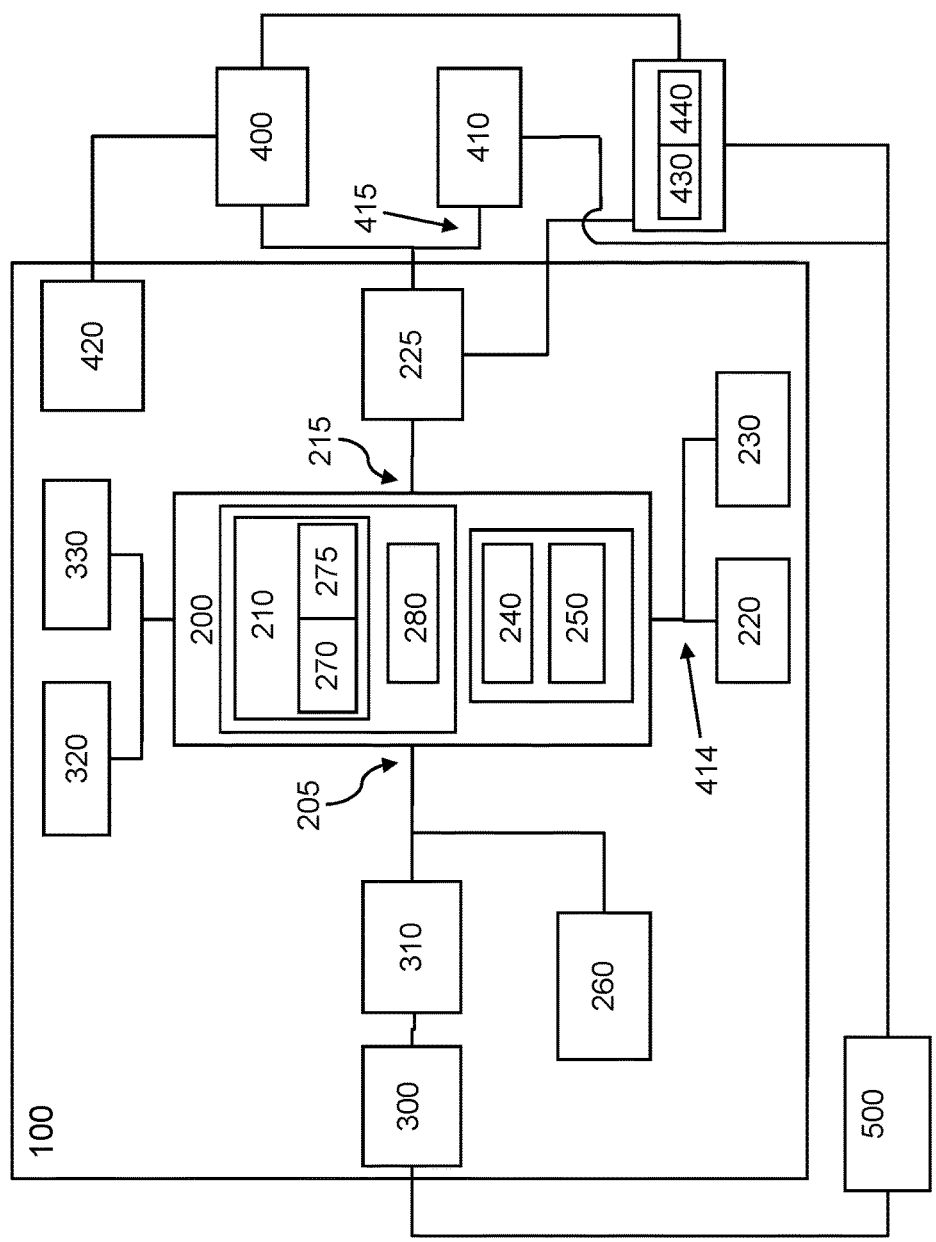
FIG. 2 is a block diagram of a possible embodiment of a pressure controller, shown within its environment.

Referring now to FIG. 2, a possible embodiment of a pressure controller (100) is shown. The pressure controller (100) includes a pressure transducer (300) which samples the pressure in the piping network (500). The pressure transducer (300) generates a pressure signal, which may optionally be amplified and converted into pressure values by the signal conditioning module (310) before entering the processor module (200) through an input (205). The processor module (200) is preferably a microcontroller. The processor module (200) includes calculating and comparing means (which will be described in greater detail below) as well as input(s) and output(s) (215) connected to a module (225), also referred to as an input-output module. Alarm and control signals are sent though the output(s) (215), via the module (225), to the control panel (400) and/or the vacuum pump (410). A power module (420), or power supply, is connected to the control panel (400).

Figure 7:
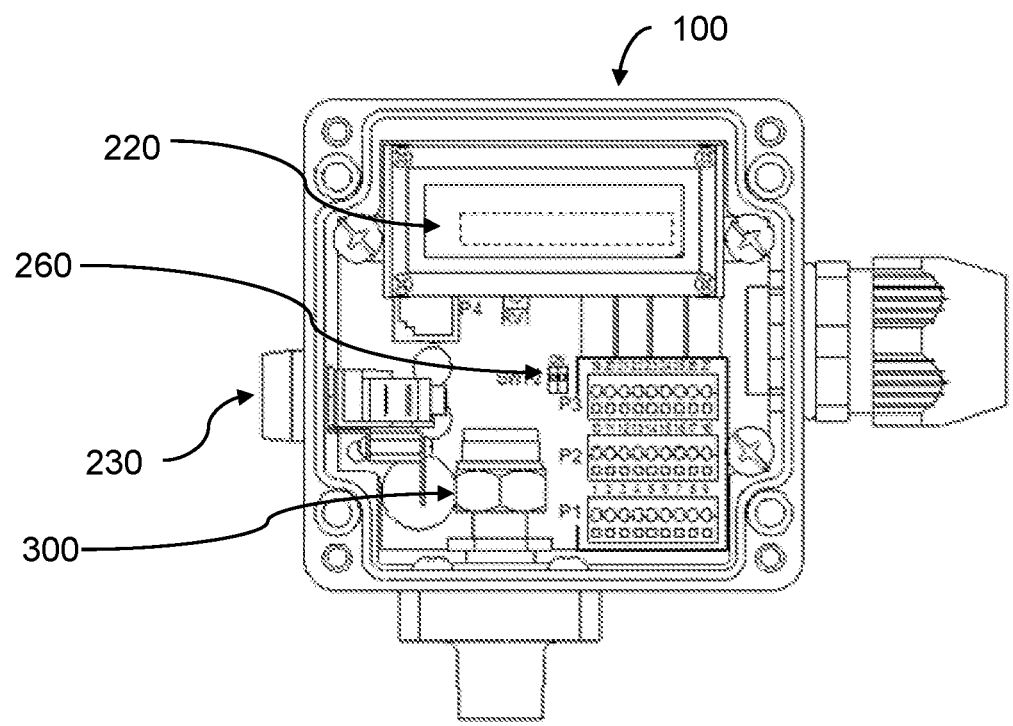
FIG. 7 is a schematic view of a pressure controller and components, according to a possible embodiment.

Still referring to FIG. 2, and also to FIG. 7, the pressure controller (100) preferably includes a timer buffer (320), which can be used to record the date/time at which the vacuum pump starts and the vacuum pump run time. The pressure controller may also include an event log (330), an output (415) connected to the vacuum pump (410), a display (220) connected to an output (414) of the processor module (200) and a control button (230), to control the display mode, i.e. the information to be displayed. The display is preferably an LCD display. The control button (230) allows users to perform different functions. Users can control the brightness of the display and access the menu in order to change the vacuum pressure units. The pressure is initially displayed in BAR/PSI but can also be displayed in KPA, PSI or BAR. The control button (230) is also used to access the menu to display events stored in the event log (330). The event log (330) comprises information on the operation of the system, which is helpful for monitoring purposes of the vacuum pump by a user for example. The display (220) can also provide information on the pressure level in the piping network, in real time.

Figure 3:
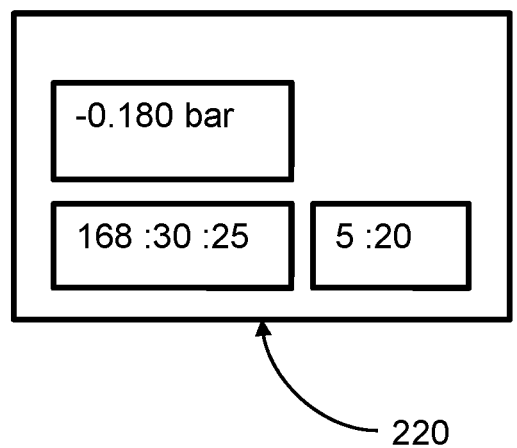
FIG. 3 is a schematic illustration of a display, according to a possible embodiment.

Referring to FIG. 3, a display according to a possible embodiment is shown. The display (220) displays the level of pressure in the piping network and the operation status of the vacuum pump (410). The hour meter on the left displays the amount of time (in hours, minutes and seconds) between the last two starts of the pump. The hour meter on the right shows the amount of time during which the pump was in operation (in minutes and seconds) during its last start. This information is stored in a timer buffer and can be useful for identifying a change of state in the piping network, or a change in the operation and/or performance of the vacuum pump. In normal time, i.e. when the system operates under normal conditions, the frequency between the pump starts, and the duration of time in which the vacuum pump is in operation should be substantially constant. In other words, time lapses that vary greatly from the standard are indicative of a problem in the system. In the example shown in FIG. 3, it can be seen that the vacuum pump starts about once a week, for a period of approximately 5 minutes. The display (220) can also display a vacuum level alarm, when the pressure in the piping network (500) is above or below predetermined pressure values. As an example only, the predetermined pressure values can include a low vacuum threshold set around −0.140 bar and a high vacuum threshold set around −0.220 bar.

Referring again to FIGS. 2 and 7, the pressure controller (100) can include an operation mode switch (260) for selecting the operation mode of the pressure controller (100). The operation modes include a supervision mode and a "fast detection" mode. The supervision mode allows opening a sprinkler head (510) while maintaining the deluge valve (440) closed. The "fast detection" mode is the default operation mode of the pressure controller (100). In "fast detection" mode, the controller can detect a sprinkler head (510) opening and trigger the activation of the fire protection deluge valve (440). An indication of the current pressure controller mode is preferably displayed on the display (220). For example, the letter [D] can be displayed to indicate that the operation mode is set to "fast detection" mode. Preferably, the pressure controller (100) allows for the deluge valve (440) opening within less than 5 seconds of the detection of a sprinkler head opening. The piping network and sprinkler heads must comply with the following conditions for a detection of a sprinkler head opening in less than 5 seconds:

| Sprinkler K Factor | Piping Network Capacity |
| --- | --- |
| K = 5.6(80) to K < 11.2(161) | 2000 US gal (7.57 m$^3$) |
| K = 11.2(161) to K < 25.2(363) | 3000 US gal (11.4 m$^3$) |
| K = 25.2(363) and higher | 4000 US gal (15.1 m$^3$) | units of K are: US gpm/psi$^{0.5}$ (L/min/(bar)$^{0.5}$)

The sprinkler K factor is used to calculate the discharge rate of the sprinkler head nozzle. The piping network capacity is a maximum volume of the piping network for a given K factor.

Figure 4:
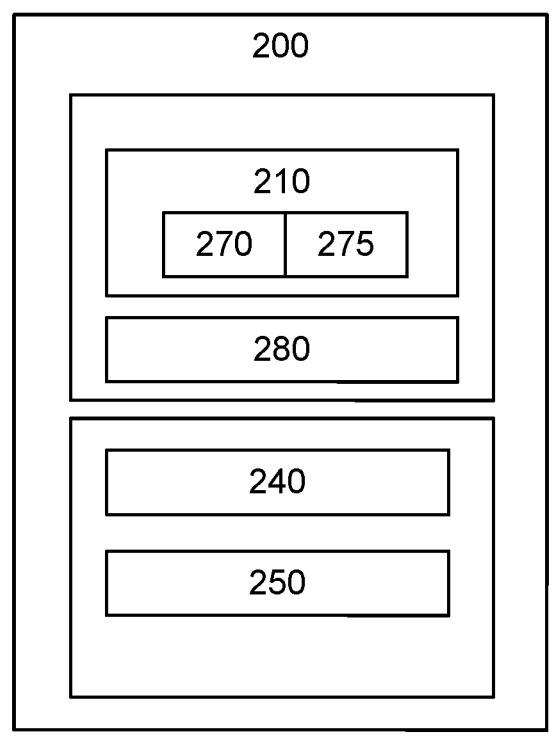
FIG. 4 is a block diagram of a processor module, according to a possible embodiment.
Figure 5:
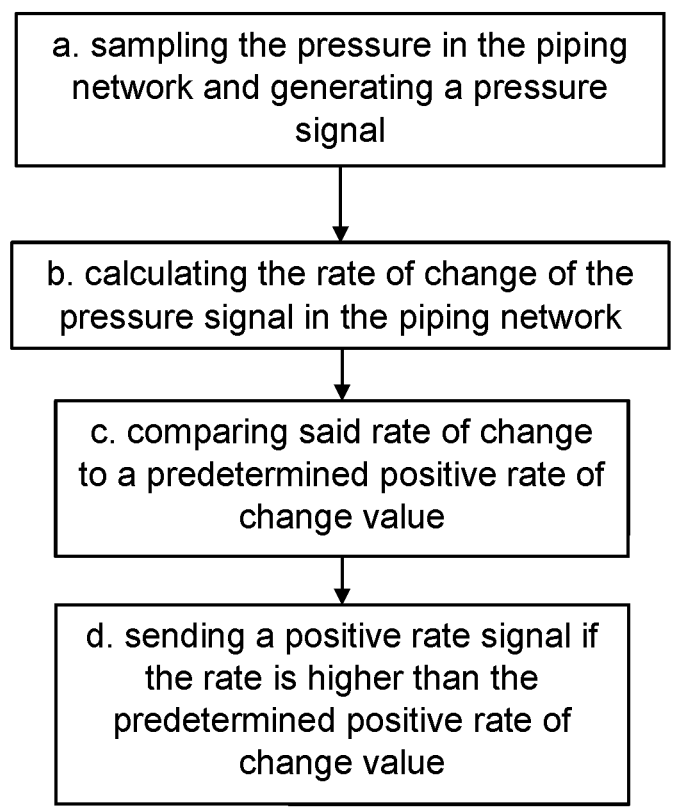
FIG. 5 is a general flowchart of a monitoring method of a piping network maintained under vacuum pressure, according to a possible embodiment.

Referring now to FIGS. 2, 3 and 4, the general method for monitoring the vacuum pressure in the piping network is described, as well as possible modules or functions of the processor module (200) used in the monitoring method. First, the pressure in the piping network is sampled by the pressure transducer (300), which generates a pressure signal. The pressure signal can be amplified and conditioned into pressure values, and the pressure values are stored in a pressure buffer (270), more specifically, in the memory of the processor (200). The pressure buffer (270) can be for example, a circular buffer (Pressure Fast detection circular buffer), but other types of buffers/storing methods can be used. The calculating means include a pressure rate calculator (210) for calculating a rate of change of the pressure signal, based on the pressure signal. The pressure rates of change or pressure "slopes" are also stored in memory, in a pressure rate buffer (280) (or "Slope buffer"), which can also be a circular buffer, but other types of buffers are possible, such as FIFO buffers. The pressure rates of change or slopes are indicative of the pressure variation in the piping network. The comparing means include a rate comparator (240) for comparing the rate of change to a predetermined positive rate of change value. This can be done by continuously comparing pressure values stored in the pressure buffer representing current pressure readings, with other pressure values previously stored in the pressure buffer representing older pressure readings, and calculating pressure rates of change indicative of the pressure variation in the piping network. The pressure rates of change can be stored in a pressure rate buffer (280), and the number of occurrences of pressure rates of change that are above a predetermined pressure rate target is monitored. The processor module (200) sends a positive rate signal through its output (215) when the rate is higher, or more positive, than the predetermined positive rate of change value. A positive rate signal is also generated when the pressure rates of change are outside of a predetermined pressure rate interval. A positive rate signal may indicate that a sprinkler head is open or that there is a gas intake in the network. One skilled in the art will understand that other methods like measuring a means, median or other similar approaches of evaluating positive pressure variation can be used.

The method may also include comparing pressure values with preset pressure values, in addition to pressure rates. As such, the comparing means may also include a pressure comparator (250) for comparing the pressure signal received by the transducer to a predetermined pressure value, and, depending on the result of the pressure comparison, the processor can send a signal to a module (225), or input-output module, through the output (215) (as shown in FIG. 2). A second pressure buffer may be used for this comparison, such as a "Pressure circular buffer". The signal can be an alarm signal or a control signal to control the vacuum pump. The alarm signal can be a low vacuum level signal when the pressure level in the piping network is equal or above a predetermined low vacuum pressure value or a high vacuum level signal when the pressure level in the piping network is equal or below a predetermined high vacuum pressure value. The control signal to control the vacuum pump can be a start signal when the pressure level in the piping network is equal or above a predetermined pressure value or a stop signal when the pressure level in the piping network is equal or below a predetermined pressure value, to re-establish the pressure in the network within a predetermined target interval. The control and alarm signals can be generated under conditions such as:

Start the vacuum pump when the piping network pressure is equal to or above −150 mbars;

Stop the vacuum pump when the piping network pressure is equal to or below −180 mbars;

Generate a "low vacuum level" signal output when the piping network pressure is equal to or above −140 mbars;

Generate a "high vacuum level" signal output when the piping network pressure is equal to or below −220 mbars; and/or Generate an "alarm vacuum level" signal output when the piping network pressure is equal to or above −130 mbars.

The processor (200) sends alarm signals or control signals to control the vacuum pump to a control panel (400) and/or directly to the vacuum pump (410), based on the result of the pressure or pressure rate comparison.

As explained previously, the pressure controller can also monitor the vacuum pump operation by starting a timer buffer (320), stopping the vacuum pump timer when the vacuum pump stops, and displaying the vacuum pump run time on the display (220).

Figure 6A:
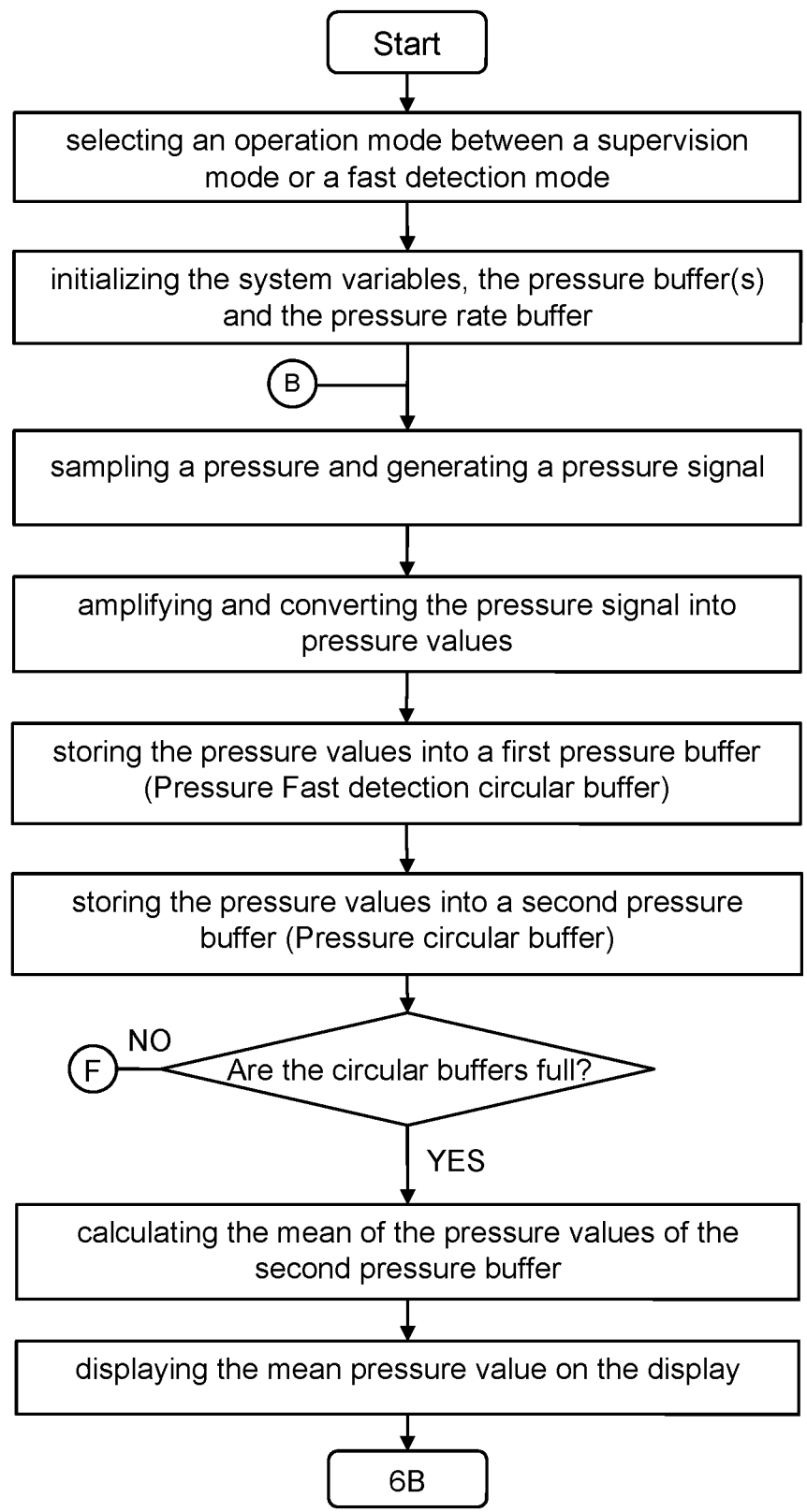
FIGS. 6A, 6B and 6C are a first, second and third sections of a detailed flowchart of a monitoring method of a piping network maintained under vacuum pressure, according to a possible embodiment.
Figure 6B:
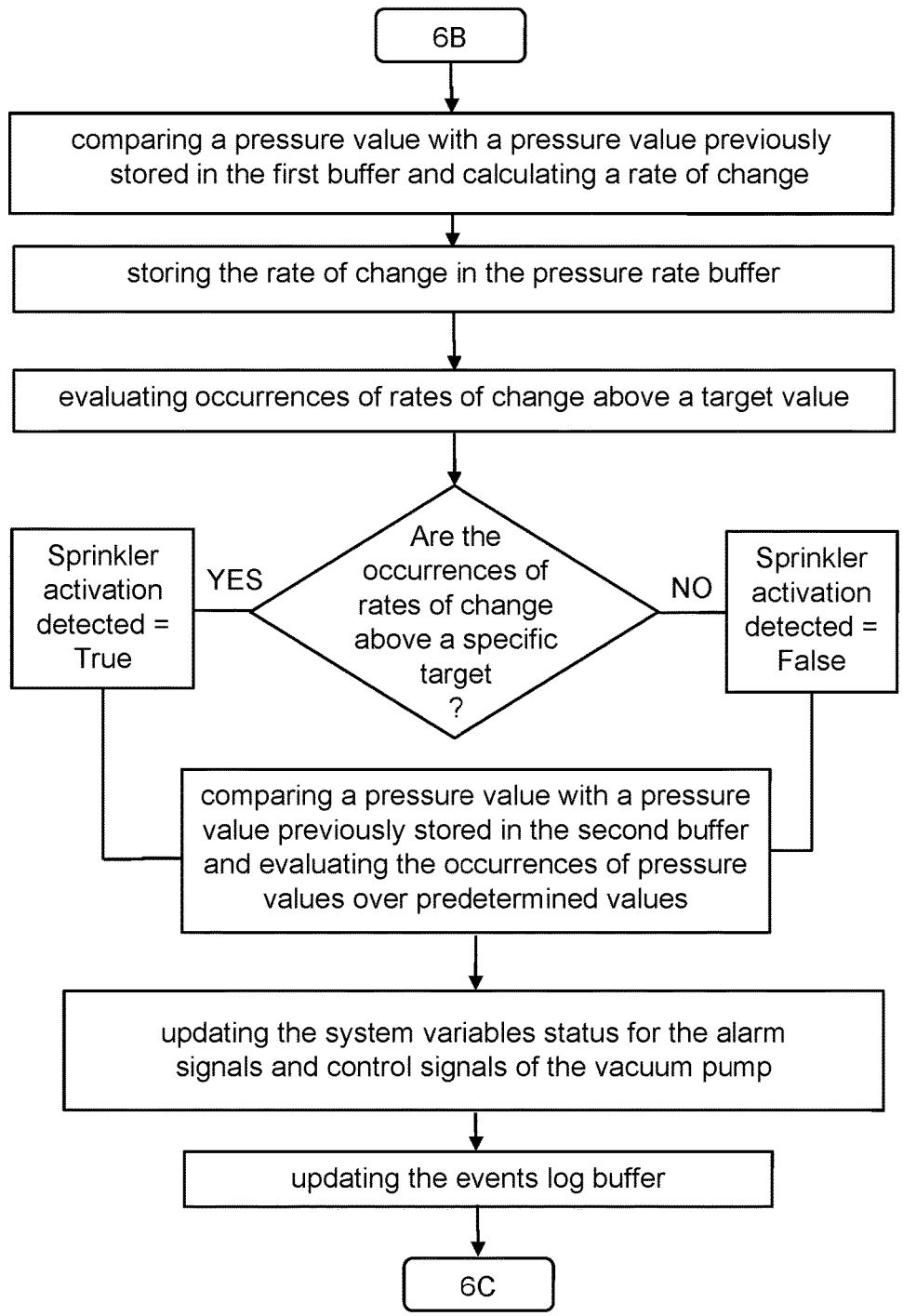
Figure 6C:
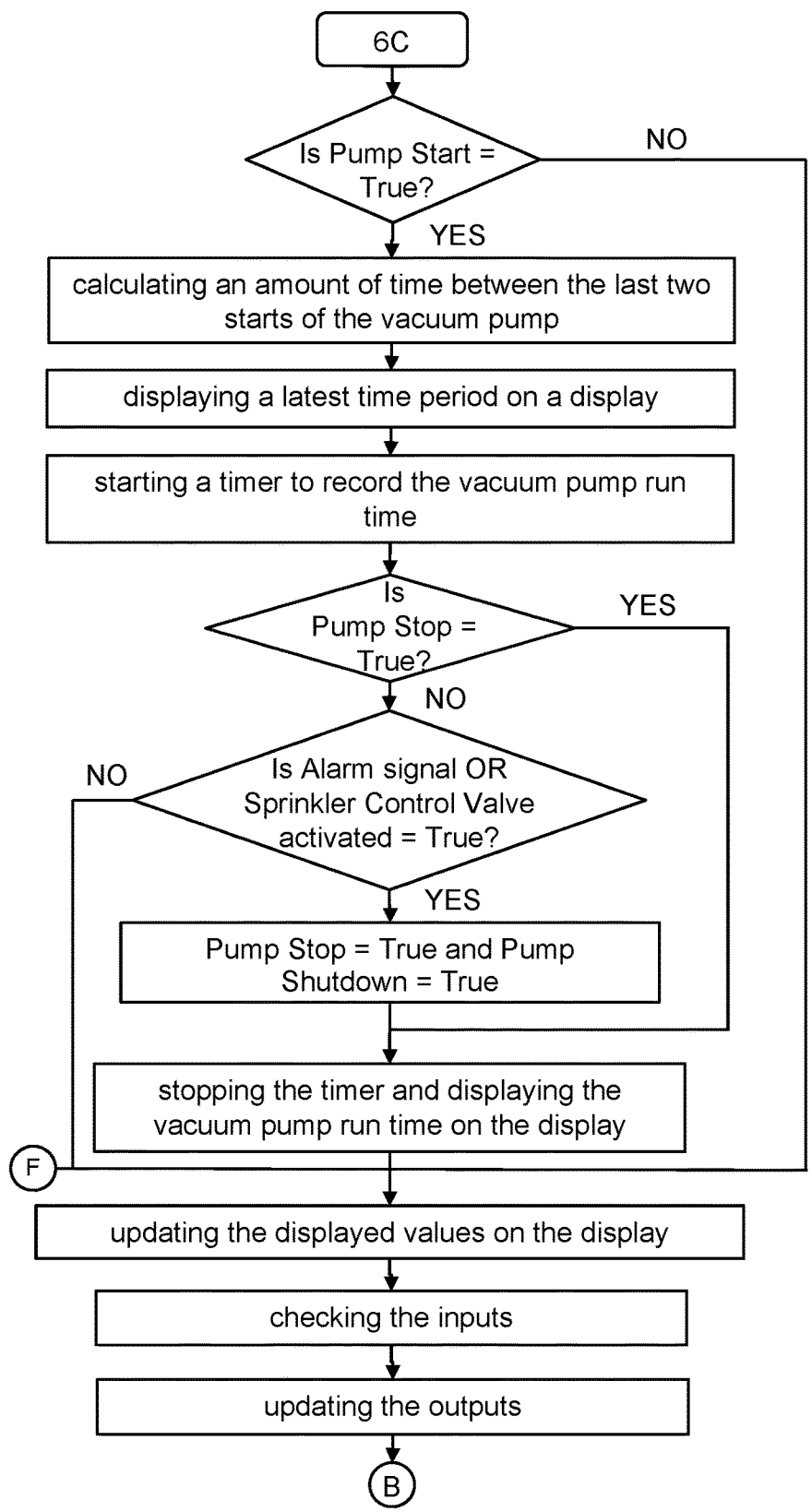

Now referring to FIGS. 6A, 6B and 6C, a possible embodiment of the method according to the invention is described in more detail. The method of monitoring a pressure level in a fire protection piping network maintained under vacuum pressure first comprises a step of selecting an operation mode between supervision mode or fast detection mode. As previously detailed, the supervision mode is used, for example to allow the opening of a sprinkler head (510) while maintaining the deluge valve (440) closed. The "fast detection" mode is the normal operation mode of the pressure controller (100). In "fast detection" mode, the controller can detect the opening of a sprinkler head (510) and trigger the opening of the fire protection deluge valve (440).

After having selected an operation mode, the system variables and buffers are initialized, for example that the variables are set to zero. Two buffers, such as the Pressure Fast detection buffer and the pressure rate buffer (slope buffer), are preferably used. A second pressure buffer (275), such as the pressure circular buffer, is optional. The role of each buffer is detailed in the following steps.

Once the buffers have been initialized, sampling of the pressure by the transducer is continuously conducted at a predetermined sampling frequency, and a pressure signal is generated. The pressure signal generated by the transducer is then amplified and converted into pressure values through the signal conditioning module (310).

The pressure values provided by the signal conditioning module (310) are stored in a first pressure buffer (270), referred to as the Pressure Fast detection circular buffer. The same pressure values are stored in a second pressure buffer (275), also named the Pressure circular buffer.

The flowchart shown in FIG. 6A includes a decision block regarding the status of the buffers at this point. A verification step to determine whether the pressure circular buffers are full is required in order to proceed with the calculations in the next steps. This verification can simply consist of ensuring that variables of the buffers have non-zero/non-null values. Another method of ensuring that the buffers are full may consist in normally sampling the pressure and waiting until a predetermined time duration has expired, which is equal to the quotient of the buffer capacity by the sampling frequency, which should ensure that the buffers comprise sufficient data. If the pressure circular buffers are determined not to be full, illustrated as the output NO in the verification step, the next steps are designated as F and include updating the display, checking inputs and updating outputs of the processor module, as shown in FIG. 6C. These steps are detailed below. Also illustrated in FIG. 6C, after updating the outputs, the subsequent step is B, which leads to the pressure sampling step of the process previously described in order to store additional pressure values in the buffers.

If the pressure circular buffers are full, illustrated as the output YES of the verification step, the pressure values stored in the buffers can now be used for calculation and comparison operations. The mean pressure value of the pressure values stored in the second pressure buffer (Pressure circular buffer) is thus calculated and displayed for example, on a display (220). This leads to step 6B.

In an embodiment, the method further comprises a step of stopping the vacuum pump when the mean pressure value is equal or below a predetermined low pressure or starting the vacuum pump when the mean pressure value is equal or above a predetermined high pressure.

As previously mentioned, the Pressure Fast detection buffer is used with a pressure rate buffer (slope buffer). The pressure signals stored in the Pressure Fast detection buffer representing current pressure signals are continuously compared with pressure signals previously stored in the Pressure Fast detection buffer. This comparison leads to the calculation of a slope value of the pressure variation. The slope value is then stored in the pressure rate buffer (or slope buffer).

As previously explained, one of the objectives of the invention is to detect a positive pressure variation, which can be indicative of a sprinkler head opening. The slope values stored in the pressure rate buffer are therefore compared to a threshold slope value and the occurrences of positive slope values over the threshold value are counted. If the number of occurrences is over a preset target amount, the output of the decision box is YES. This indicates that a sprinkler head is activated. If the occurrence count is under a preset target amount, the output of the decision box is NO, and no sprinkler head activation is detected.

Pressure values are also stored in the pressure circular buffer, as shown in FIG. 6A. Similar to the Pressure Fast detection buffer, pressure values stored in the pressure circular buffer are continuously compared with older pressure values previously stored in the pressure circular buffer. However, an evaluation of the number of occurrences of pressure values over a target value is then conducted as shown in FIG. 6B. Depending on the number of occurrences of pressure values outside a preferred pressure interval, alarm signals or vacuum pump control signals are generated. Alarm signals include generating low, high, or alarm vacuum level signals. Vacuum pump control signals include starting or stopping the vacuum pump. For example, a vacuum pump control signal is generated when the piping network pressure (or "vacuum pressure") is equal to or above −150 mbars.

Next, the system variables' status for these alarm and vacuum pump control signals are updated. The event log buffer is also updated. The event log can thus be used to manually identify the last instance of an alarm or of a shutdown of the vacuum pump, for example.

The vacuum pump monitoring method is further illustrated in FIG. 6C. The output of the first decision block of FIG. 6C is NO if the pump is not running. This leads to updating the display with the mean value of the system pressure. The output of the first decision block of FIG. 6C is YES if the pump is running. The elapsed time between the last two starts of the vacuum pump is calculated and displayed on the display. The time duration is indicative of a change of state in the piping network and/or of the vacuum pump. The frequency of the vacuum pump operation and the duration of operation should be constant.

In addition to calculating the amount of time between two starts of the vacuum pump, the monitoring step comprises recording the pump run time using a clock or a timer buffer. If the pump is stopped, the output of the second decision block of FIG. 6C will be YES, which therefore leads to stopping the clock or timer buffer. The resulting pump run time will be displayed on the display. The output of the second decision block will be NO if the pump is running. The output of the third decision block will be NO if no alarm signal is generated and the deluge valve is closed. If an alarm signal is generated or if the deluge valve is opened, the output of the third decision block will be YES. These conditions mean that the pump is not running, and therefore the clock or timer buffer is stopped and the pump run time is displayed on the display. Finally, the elapsed time between two starts of the vacuum pump, the vacuum pump run time, and the level of pressure in the piping network, are updated on the display. The inputs to the processor module are checked and the outputs to the control panel and to the vacuum pump are updated. The process continues with step B, which leads back to sampling a pressure signal in the piping network as shown on FIG. 6A.

In an embodiment, the method further comprises a step of sending an output signal to stop the vacuum pump (410) if the vacuum pump has been in operation over a predetermined period of time.

Several alternative embodiments and examples have been described and illustrated herein. The embodiments of the invention described above are intended to be exemplary only. A person of ordinary skill in the art would appreciate the features of the individual embodiments, and the possible combinations and variations of the components. A person of ordinary skill in the art would further appreciate that any of the embodiments could be provided in any combination with the other embodiments disclosed herein. It is understood that the invention may be embodied in other specific forms without departing from the central characteristics thereof. The present examples and embodiments, therefore, are to be considered in all respects as illustrative and not restrictive, and the invention is not to be limited to the details given herein. Accordingly, while the specific embodiments have been illustrated and described, numerous modifications come to mind. The scope of the invention is therefore intended to be limited solely by the scope of the appended claims.

The invention claimed is:

1. A pressure controller for use in a fire protection system comprising a deluge valve and a piping network maintained under vacuum pressure by a vacuum pump, to monitor a pressure level in the piping network, the controller comprising:
   a pressure transducer for sampling a pressure in the piping network and generating a pressure signal, and
   a processor module including:
      an input receiving the pressure signal from the pressure transducer,
      a pressure rate calculator calculating a rate of change of the pressure signal,
      a rate comparator comparing said rate of change to a predetermined positive rate of change value, and
      an output for sending a positive rate signal when the rate of change is higher than the predetermined positive rate of change value, the positive rate signal being indicative that a sprinkler head of the piping network is open said positive rate signal triggering the opening of the deluge valve,
   wherein the processor module provides alarm signals indicating a low vacuum level when the pressure level in the piping network is equal or above a predetermined low vacuum pressure value and a high vacuum level when the pressure level in the piping network is equal or below a predetermined high vacuum pressure value.

2. The pressure controller according to claim 1, wherein the processor module further comprises a pressure comparator for comparing the pressure signal to a predetermined pressure value, the output being connected to a module for providing signals based on a pressure comparison result generated by the pressure comparator, said signals comprising control signals to control the vacuum pump or the alarm signals.

3. The pressure controller according to claim 1, wherein the processor module is a microcontroller.

4. The pressure controller according to claim 1, wherein the processor module further comprises a pressure comparator for comparing the pressure signal to a predetermined pressure value, the output being connected to a module for providing signals based on a pressure comparison result generated by the pressure comparator, said signals comprising control signals to control the vacuum pump or alarm signals.

5. The pressure controller according to claim 4, wherein the processor module provides the control signals to control the vacuum pump, said control signals being provided to start the vacuum pump when the pressure level in the piping network is equal or above a predetermined pressure value and to stop the vacuum pump when the pressure level in the piping network is equal or below a predetermined pressure value.

6. The pressure controller according to claim 1, wherein the pressure rate calculator comprises a pressure rate buffer for storing several rates of change.

7. The pressure controller according to claim 1, wherein the processor module further comprises at least one pressure buffer for storing several pressure values.

8. The pressure controller according to claim 1, further comprising an operation mode switch for selecting operation modes of the controller, said operation modes including at least a supervision mode and a fast detection mode, wherein the supervision mode allows an opening of a sprinkler head of the piping network while maintaining a deluge valve closed, and wherein the fast detection mode detects an opening of a sprinkler head of the piping network and triggers an opening of the deluge valve.

9. The pressure controller according to claim 1, further comprising a service valve connected to a control panel and to the pressure controller, for controlling a fluid flow in the piping network during maintenance operations.

10. The pressure controller according to claim 1, further comprising an output connected to the vacuum pump, and a display connected to an output of the processor module for displaying at least one of: a level of pressure in the piping network in real time and an operation status of the vacuum pump.

11. The pressure controller according to claim 10, further comprising a control button for displaying an event log on the display and thereby allowing monitoring of the vacuum pump by a user.

12. A method for monitoring a pressure level in a piping network in a fire protection system, the fire protection system including a deluge valve, the piping network being maintained under vacuum pressure by a vacuum pump, the method comprising the steps of:
   a) sampling the pressure in the piping network with a pressure transducer that generates a pressure signal,
   b) calculating a rate of change of the pressure signal of step a),
   c) comparing said rate of change to a predetermined positive rate of change value, and
   d) sending a positive rate signal when the rate of change is higher than the predetermined positive rate of change value, the positive rate signal being indicative that a sprinkler head of the piping network is open, the positive rate signal triggering the opening of the deluge valve, wherein a control signal to control the vacuum pump is sent to start the vacuum pump when the pressure level in the piping network is equal or above a predetermined pressure value and to stop the vacuum pump when the pressure level in the piping network is equal or below a predetermined pressure value.

13. The method according to claim 12, further comprising:
   i. comparing the pressure signal generated at step a) to predetermined pressure values, and generating a pressure comparison result, and
   ii. sending an alarm signal or the control signal to control the vacuum pump based on the pressure comparison result generated at step i).

14. The method according to claim 13, further comprising a step of displaying a vacuum level alarm on a display, indicative of whether the pressure level in the piping network is above or below said predetermined pressure values.

15. The method according to claim 14, wherein said predetermined pressure values include a low vacuum threshold set around −0.140 bar and a high vacuum threshold set around −0.220 bar.

16. The method according to claim 14, further comprising the steps of:
   calculating an amount of time between last two starts of the vacuum pump, and
   displaying a latest time duration on the display, said latest time duration being indicative of at least one of: a change of state in the piping network and a change of state of the vacuum pump.

17. The method according to claim 16, further comprising the step of storing the latest time duration in a timer buffer.

18. The method according to claim 12, further comprising the steps of:
   e) between steps a) and b), amplifying and converting the pressure signal into pressure values, storing the pressure values in a first pressure buffer, continuously comparing pressure values stored in the first pressure buffer representing current pressure readings with other pressure values previously stored in the first pressure buffer,
   f) continuously repeating step b) based on the pressure values compared at step e) to obtain rates of change, indicative of a pressure variation in the piping network,
   g) storing the rates of change in a pressure rate buffer,
   h) monitoring a number of occurrences of the rates of change that are above a predetermined pressure rate target,
   i) at step d), generating an alarm signal when at least one of the conditions is met:
      the current pressure readings are outside of a predetermined pressure interval, and
      the number of occurrences of the rates of change is above a set target.

19. The method according to claim 18, further comprising the steps of:
   j) selecting an operation mode between a supervision mode and a fast detection mode, and
   k) initializing the pressure buffer and the pressure rate buffer.

20. The method according to claim 18, further comprising the steps of:
   j) storing the pressure values obtained at step e) in a second pressure buffer,
   k) calculating a mean pressure value based on the pressure values stored in the second pressure buffer, and
   l) displaying the mean pressure value.

21. The method according to claim 20, further comprising a step of stopping the vacuum pump when the mean pressure value is equal or below a predetermined low pressure or starting the vacuum pump when the mean pressure value is equal or above a predetermined high pressure.

22. The method according to claim 12, further comprising a step of sending an output signal to stop the vacuum pump when said vacuum pump operates for a period of time longer than a predetermined period of time.

23. The pressure controller according to claim 1, wherein the positive rate signal triggers the opening of the deluge valve in less than 5 seconds, and the pressure controller is used in one of: a piping network having a maximum capacity of 2000 US gallons with sprinklers having a K factor between 5.6 and less than 11.2; a piping network having a maximum capacity of 3000 US gallons with sprinklers having a K factor between 11.2 and less than 25.2; and a piping network having a maximum capacity of 4000 US gallons with sprinklers having a K factor between 25.2 and higher.

24. The method according to claim 12, wherein the positive rate signal triggers the opening of the deluge valve in less than 5 seconds, and the piping network is one of: a piping network having a maximum capacity of 2000 US gallons with sprinklers having a K factor between 5.6 and less than 11.2; a piping network having a maximum capacity of 3000 US gallons with sprinklers having a K factor between 11.2 and less than 25.2; and a piping network having a maximum capacity of 4000 US gallons with sprinklers having a K factor between 25.2 and higher.

25. The pressure controller according to claim 1, the rate comparator detects vacuum pressure increases of about 0.01 psi per second.

26. The pressure controller according to claim 12, wherein in step c), vacuum pressure increases of about 0.01 psi per second are detected.

* * * * *

UNITED STATES PATENT AND TRADEMARK OFFICE
CERTIFICATE OF CORRECTION

PATENT NO. : 9,987,509 B1  
APPLICATION NO. : 15/656309  
DATED : June 5, 2018  
INVENTOR(S) : Jean-Pierre Asselin et al.

Page 1 of 1

It is certified that error appears in the above-identified patent and that said Letters Patent is hereby corrected as shown below:

In the Claims

Columns 9, Line 63, through Column 10, Line 3, Claim 2 should read --The pressure controller according to claim 1, further comprising a signal conditioning module located between the pressure transducer and the processor module, for amplifying and converting the pressure signal generated by the pressure transducer into pressure values prior to its input in the processor module.--

Signed and Sealed this  
Seventh Day of May, 2019

Andrei Iancu  
*Director of the United States Patent and Trademark Office*